K. A. BLYSTAD.
RUNNER FOR VEHICLES.
APPLICATION FILED MAY 17, 1918.
1,315,360.
Patented Sept. 9, 1919.
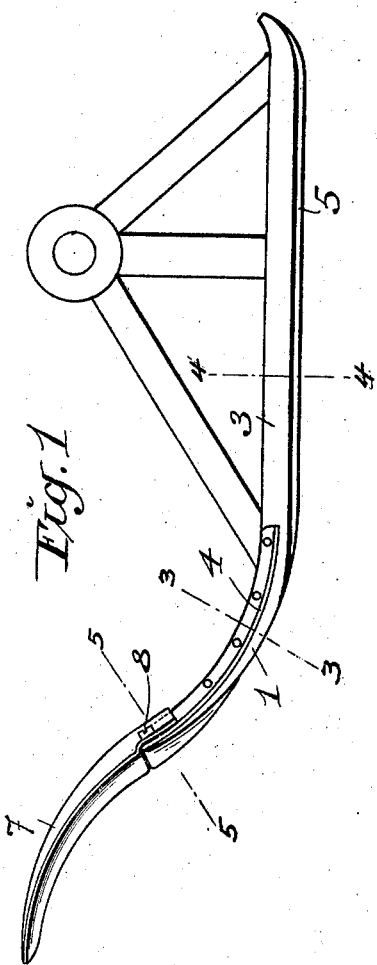
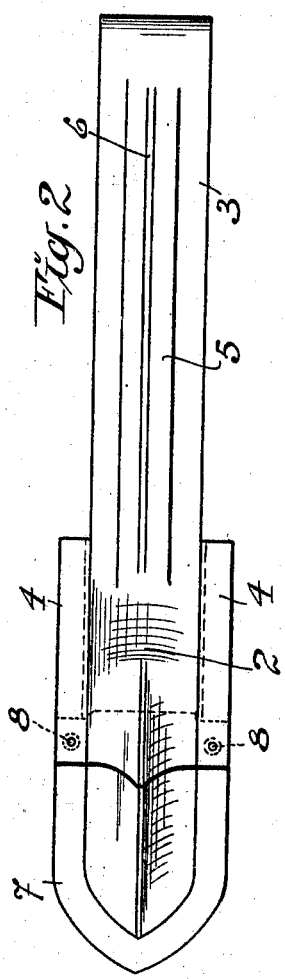
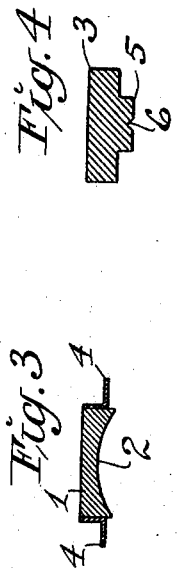
INVENTOR:
Karl August Blystad
ATTY.

UNITED STATES PATENT OFFICE.

KARL AUGUST BLYSTAD, OF KONGSVINGER, NORWAY.

RUNNER FOR VEHICLES.

1,315,360. Specification of Letters Patent. Patented Sept. 9, 1919.

Application filed May 17, 1918. Serial No. 235,184.

*To all whom it may concern:*

Be it known that I, KARL AUGUST BLY-STAD, a subject of the King of Norway, and resident of Kongsvinger, in the Kingdom of Norway, have invented certain new and useful Improvements in Runners for Vehicles, of which the following is a specification, reference being had therein to the accompanying drawing.
For the driving in motor-actuated carriages, automobiles and the like, on snow runners have been proposed and also used instead of the fore wheels, or runners have been mounted under the said wheels, in order that the automobile may run more easily. This invention relates to an improvement in the said runners whereby when driving on loose snow they effect a groove of packed snow, in which the rear wheels or the driving wheels find a hold more reliably and consequently do not slide so easily. This is gained by providing in the fore part of the runner, which is curved upward, a preferably concave groove, extending longitudinally of the runner and substantially to the straight part of the same or, it may be, for a distance along the same. While the automobile is forced forward the said groove prevents the snow from being dispersed toward the sides of the runner but gathers the snow to a round, which is then packed by the straight part of the runner, so that the groove effected in the snow by the runner has a more compact bottom, which the driving wheel may engage. In order to prevent the snow located at the sides of the said groove from wearing out the side parts of the tire of the driving wheel, the fore part of the runner is provided with lateral wings, flanges or projections, which preferably extend along the curved part of the runner and flatten or force down the snow located at the sides of the runner.
In the accompanying drawing a runner is shown arranged in accordance with this invention. Figure 1 is a side view and Fig. 2 a bottom plan view of the runner. Figs. 3, 4 and 5 are sections on the line 3—3, 4—4 and 5—5 respectively of Fig. 1.

The runner shown in the drawing and adapted to be substituted for the fore wheels of an automobile is provided with spokes and a hub, so that it can be slid on the trunnion of the said wheel. The runner is held in its position on the said trunnion by chains or the like in the ordinary manner which chains are fixed to the fore and rear parts of the runner and to the frame of the automobile preferably in a yielding manner. According to this invention the fore curved part 1 of the runner has a longitudinal cavity or concave groove 2, which extends substantially to the vicinity of the straight part 3 of the runner or for some distance along the same. As the automobile runs on loose snow the said groove 2 prevents the snow from being dispersed toward the sides of the runner but instead it gathers the snow to a round, which is then packed by the subsequent straight part of the runner. Consequently, the groove effected by the runner gets a compact bottom, which the rear or driving wheel may engage in a reliable manner. The shape of cross section of the groove 2 may evidently differ from that shown in the drawing. If the driving wheel is double (as is the case in freight wagons) the width of the runner is adapted thereto.

In order that the snow located at the sides of the groove effected by the runner may neat wear out the tire of the wheel the said runner is provided with lateral wings, flanges or projections 4, located on the curved part 1 of the runner. The said wings, which extend substantially to the connection between the curved part and the straight part of the runner, press and flatten down the snow at the sides of the runner for such a width, that the parts of the tire, located at opposite sides of the center part of the tire engaging the snow, do not come into contact with the snow and consequently are not subjected to wear effected by the snow, which otherwise is considerable especially in hard snow. The said wings also assist the runner in sliding upward on drifts.

The cross section of the top part of the runner is, preferably, substantially triangular, as shown in Fig. 5 in order that the runner like a plow may force its way through drifts.

In order that the runner may slide easily on hard snow or on ice, it may be provided with a narrower central part or rib 5, in which a central groove 6 may be provided, which extends longitudinally of the runner and renders more safe the running of the carriage. The said central rib 5 also prevents the automobile from sliding sidewise.

For the driving in very deep snow and in drifts the curved fore part of the runner may be extended upward and forward by means of a part 7, (shown by full lines in Figs. 1 and 2) suitably curved and, it may be, provided with a groove or ridge, the said part being fixed by means of screws 8 or in any other detachable manner.

Having now described my invention, what I claim as new and desire to secure by Letters Patent is:

1. A front sleigh runner for vehicles comprising a linear portion having a centrally disposed, longitudinally extending rib on its under side, said rib being formed with a groove, and an upwardly curved portion having a concave groove formed in its under side, and laterally disposed wings secured to the sides of said curved portion.

2. A front sleigh runner for vehicles comprising a linear portion having a centrally disposed, longitudinally extending rib on its under side, said rib being formed with a groove, and an upwardly curve portion having a concave groove formed in its under side for a portion of its length and a depending ridge on the remaining portion, and laterally disposed wings secured to the sides of the upper curved portion and coextensive in length therewith.

3. A front sleigh runner for vehicles comprising a linear portion having a centrally disposed, longitudinally extending rib on its under side, said rib being formed with a groove, and an upwardly curved portion having a concave groove formed in its under side for a portion of its length, and a depending rib on the remaining portion, and laterally disposed wings secured to the sides of the upper curved portion, and a curved extension detachably secured to the forward end of said runner, and a centrally disposed rib formed on said extension forming a continuation of the rib on said runner.

4. A front sleigh runner for vehicles comprising a rear linear portion and a forward upwardly curved portion having a concaved under side, and laterally disposed wings secured to said curved portion.

In witness whereof I have hereunto signed my name.

KARL AUGUST BLYSTAD.

Copies of this patent may be obtained for five cents each, by addressing the "Commissioner of Patents, Washington, D. C."